United States Patent [19]

Teramachi

[11] 4,438,986

[45] Mar. 27, 1984

[54] BALL SCREW ASSEMBLY CONTAINING A BALL SPLINE UNIT FOR EXACT SLOW FEED AND POWER TRANSMISSION MECHANISM COMPRISING SAID BALL SCREW ASSEMBLY

[76] Inventor: Hiroshi Teramachi, 34-8, Higashi-Tamagawa 2-chome, Setagaya-ku, Tokyo, Japan, 158

[21] Appl. No.: 346,692

[22] Filed: Feb. 8, 1982

[30] Foreign Application Priority Data

Mar. 13, 1981 [JP] Japan ................... 56-35418
Oct. 5, 1981 [JP] Japan ................... 56-157454

[51] Int. Cl.³ ................ F16C 31/04; F16C 29/10; F16H 92/20; F16H 1/20
[52] U.S. Cl. .................. 308/6 R; 308/3 A; 74/89.15; 74/424.8 R; 74/424.8 B
[58] Field of Search ............ 308/3 A, 3 R, 6 R, 6 C; 74/89.15, 424.8 B, 424.8 R; 269/240–253, 172–187; 82/21 R, 27

[56] References Cited

U.S. PATENT DOCUMENTS

| | | | |
|---|---|---|---|
| 1,426,546 | 8/1922 | Buttrum | 82/27 X |
| 2,092,563 | 9/1937 | Tucker | 74/424.8 B |
| 2,842,978 | 7/1958 | Orner | 74/424.8 R |
| 3,449,978 | 6/1969 | Stmpson | 74/424.8 R |
| 3,844,177 | 10/1974 | Bourassa | 74/89.15 |
| 4,373,404 | 2/1983 | Heinz | 74/424.8 B |

*Primary Examiner*—Stuart S. Levy
*Assistant Examiner*—Thomas R. Hannon
*Attorney, Agent, or Firm*—George B. Oujevolk

[57] ABSTRACT

The ball screw assembly disclosed makes use of a shaft consisting of two parts, one of them being formed as a spline and the other one containng at least two screws spaced from one another at a predetermined distance, wherein the respective screws having a different pitch are in screw engagement with a corresponding ball screw nut and the ball spline unit is fitted onto the spline. Actually, these two screws are in engagement with corresponding stationary and movable ball screw nuts. The stationary nut being held in a housing, while said movable ball screw nuts is adapted to move forward or backward by way of rotation of the shaft. The feed is controlled by way of mechanical or electromagnetic actuation so that quick feed, rough feed, slow feed or exact feed is ensured by the single shaft.

3 Claims, 13 Drawing Figures

BALL SCREW ASSEMBLY CONTAINING A BALL SPLINE UNIT FOR EXACT SLOW FEED AND POWER TRANSMISSION MECHANISM COMPRISING SAID BALL SCREW ASSEMBLY

FIELD OF THE INVENTION

The present invention relates to a ball screw assembly in which ball screw nuts move forward or backward by way of rotation of a shaft at a certain feed rate which is determined by the difference in pitch of the corresponding screws on the shaft. Further, the present invention relates also to a power transmission utilizing the ball screw assembly in which exact slow feed is ensured merely by a single shaft.

The terms "ball screw nuts" as referred to herein represent the prestressed ball screw nuts.

The prestressed ball screw nuts are characterized by excellent accuracy in forward and backward displacement, reduced frictional force, easy rotation and long running life.

The terms "ball spline unit" as referred to herein represent a unit which comprises a spline shaft, an outer sleeve and a number of balls interposed therebetween for ensuring free axial displacement of the spline shaft whereby rotational torque of the spline shaft is transmitted to the outer sleeve.

Further, the stationary ball screw nut as referred to herein is such that the nut portion does not move by way of rotation of the ball screw.

BRIEF EXPLANATION OF THE PRIOR ART

The conventional switching device for quick feed or exact slow feed utilizes a speed changing mechanism in which a plurality of gears are used in a complicated manner, and/or a compound mechanism in which a combination of gear and worm wheel are used with their axes extending at a right angle. However, the conventional device is complicated and requires a considerably wide space, resulting in difficulties in ensuring highly exact feed.

Also, the conventional power transmission mechanism is constructed of a number of complicated parts or components and requires a complicated feeding structure. Thus, it is difficult to design the whole transmission mechanism in a compact fashion and moreover it is particularly difficult to ensure exact feed due to backlash, accuracy error and others caused by the complicated structure and necessity for many parts or components.

Due to the arrangement that power transmission for forward or backward displacement of cutting tools, tables or workpiece is effected by means of a complicated mechanism such as gearing mechanism, belt mechanism, chain mechanism, link mechanism, cam mechanism or the like it is difficult to use a single shaft for the purpose of power transmission in view of the drawback that the whole assembly becomes larger. In addition to the above difficulty in incorporating it into the assembly it is not easy to perform inspection and maintenance.

It is already known that a single shaft contains screws located at both sides thereof in a spaced relation, said screws being in screw engagement with nuts, one of them being fixedly secured to a base, while the other one is incorporated in a slide mounted on the base. It has been found, however, that the conventional nut in screw engagement with the shaft suffers from high frictional coefficient which makes it difficult to drive the assembly with small power input.

SUMMARY OF THE INVENTION

Briefly stated, the present invention contemplates to providing a power transmission mechanism which uses a single shaft consisting of two screws having a different pitch respectively and a ball spline located at the rear end part of the shaft. These screws are adapted to move forward or backward by way of rotation of the shaft at a feed rate corresponding to the difference in pitch therebetween, so that slow and very slow feeding are ensured.

Further, there is provided in accordance with another aspect of the present invention a power transmission mechanism for ensuring an exact slow feed with a ball screw assembly containing a ball spline unit, said ball screw assembly comprising a single shaft consisting of two parts, one of them being formed as a spline and the other one containing at least two screws spaced from one another at a predetermined distance. The respective screws have a different pitch and are in engagement with a corresponding ball screw nut and the ball spline unit is fitted onto the spline. More particularly, the ball screw nuts comprise a stationary ball screw nut and a movable ball screw nut. The stationary ball screw nut is held in a housing and the movable ball screw nut is secured to a moving member, the ball spline unit is rotatably arranged at the rear part of the housing with a ring member disposed on the spline and a rotational driving member is attached to the outer periphery of the ball spline unit.

Other objects and advantageous features of the present invention will be readily understood from the following description made with reference to the accompanying drawings, in which:

BRIEF DESCRIPTION OF THE ACCOMPANYING DRAWINGS

Figure 3A:
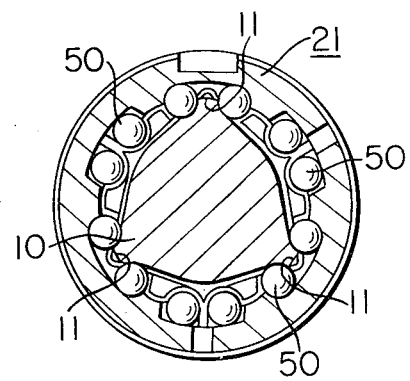
Figure 3B:
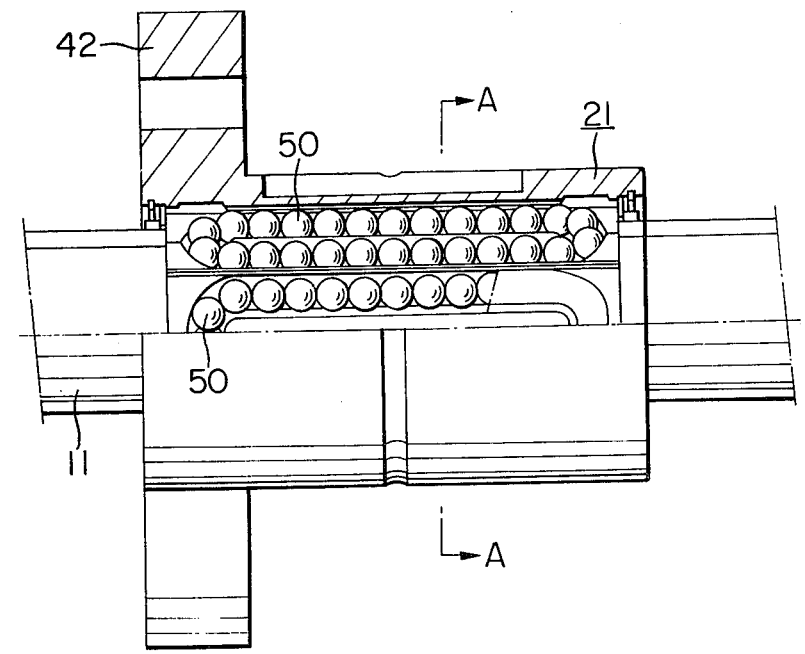

FIGS. 3(a) and 3(b) illustrate a ball spline unit utilized for the present invention, wherein FIG. 3(a) is a cross-sectional view taken on line A—A in FIG. 3(b) and FIG. 3(b) is a partially sectioned front view of which the upper half is sectioned.

Figure 4A:
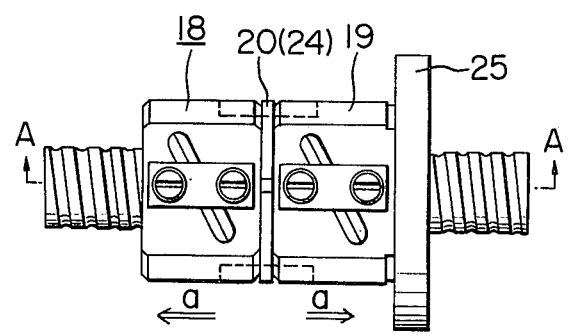
Figure 4B:
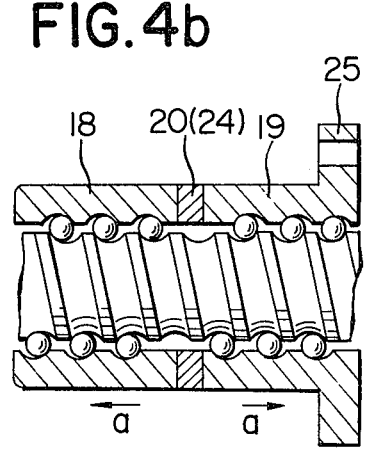

FIGS. 4(a) and 4(b) illustrate a ball screw nut utilized for the present invention, wherein FIG. 4(a) is a front view and FIG. 4(b) is a longitudinally sectioned view taken on line A—A in FIG. 4(a).

Figure 5:
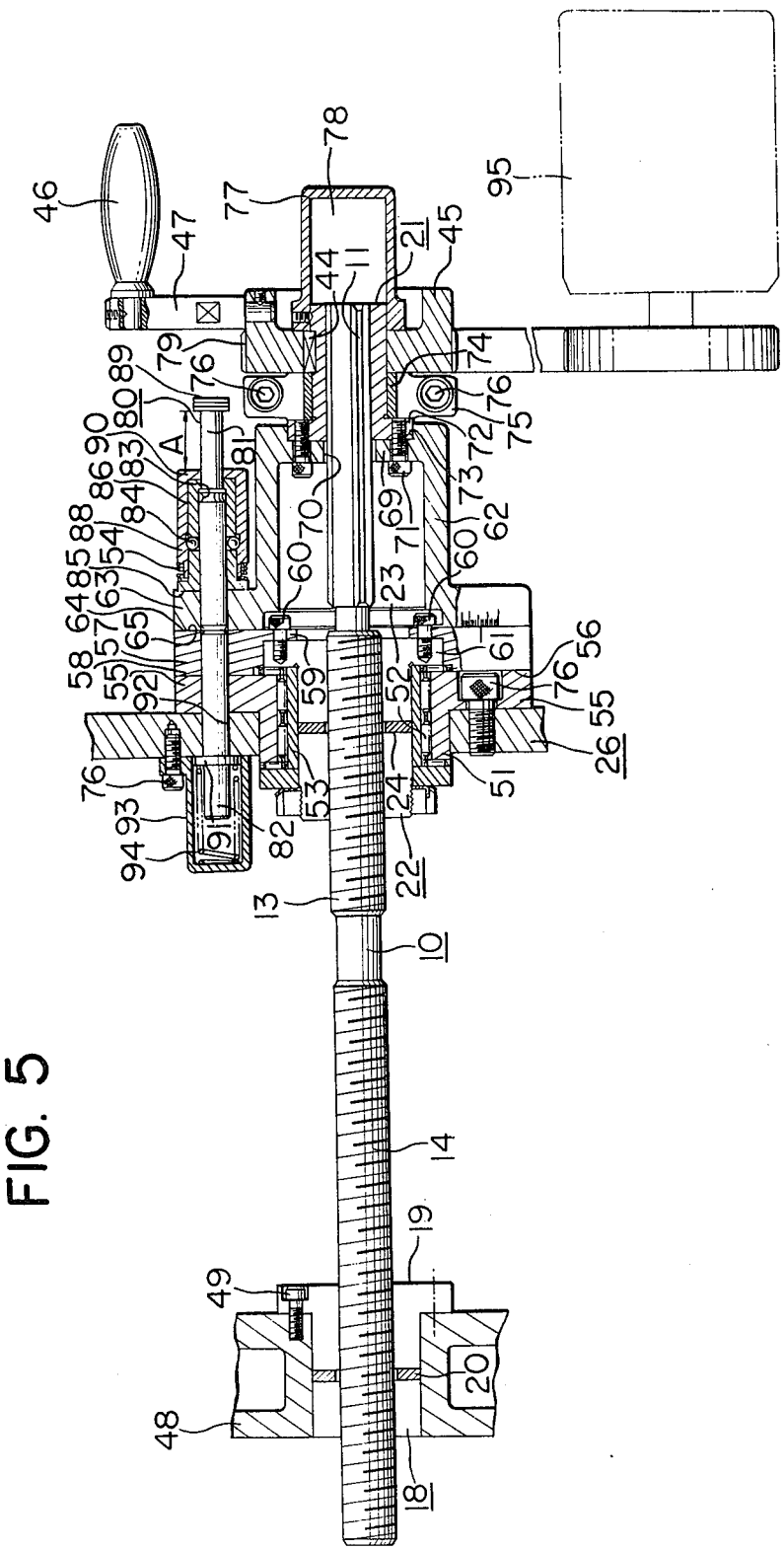

FIG. 5 is a sectional view of the ball screw assembly in accordance with another embodiment of the present invention where the assembly of the invention is applied to a table of a machine tool which is adapted to move at a slow feed rate.

Figure 6A:
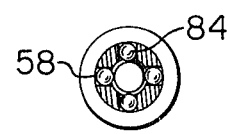
Figure 6B:
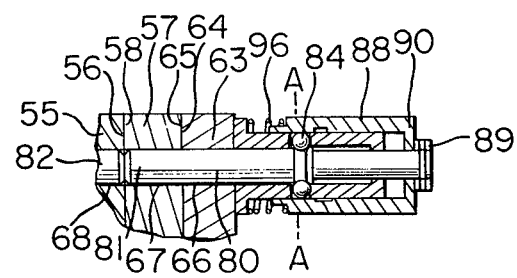

FIGS. 6(a) and 6(b) a knock pin for the ball screw assembly of the present invention, wherein FIG. 6(a) is a cross-sectional view taken on line A—A in FIG. 6(b) and FIG. 6(b) is a sectional view which is located for quick feed.

Figure 7:
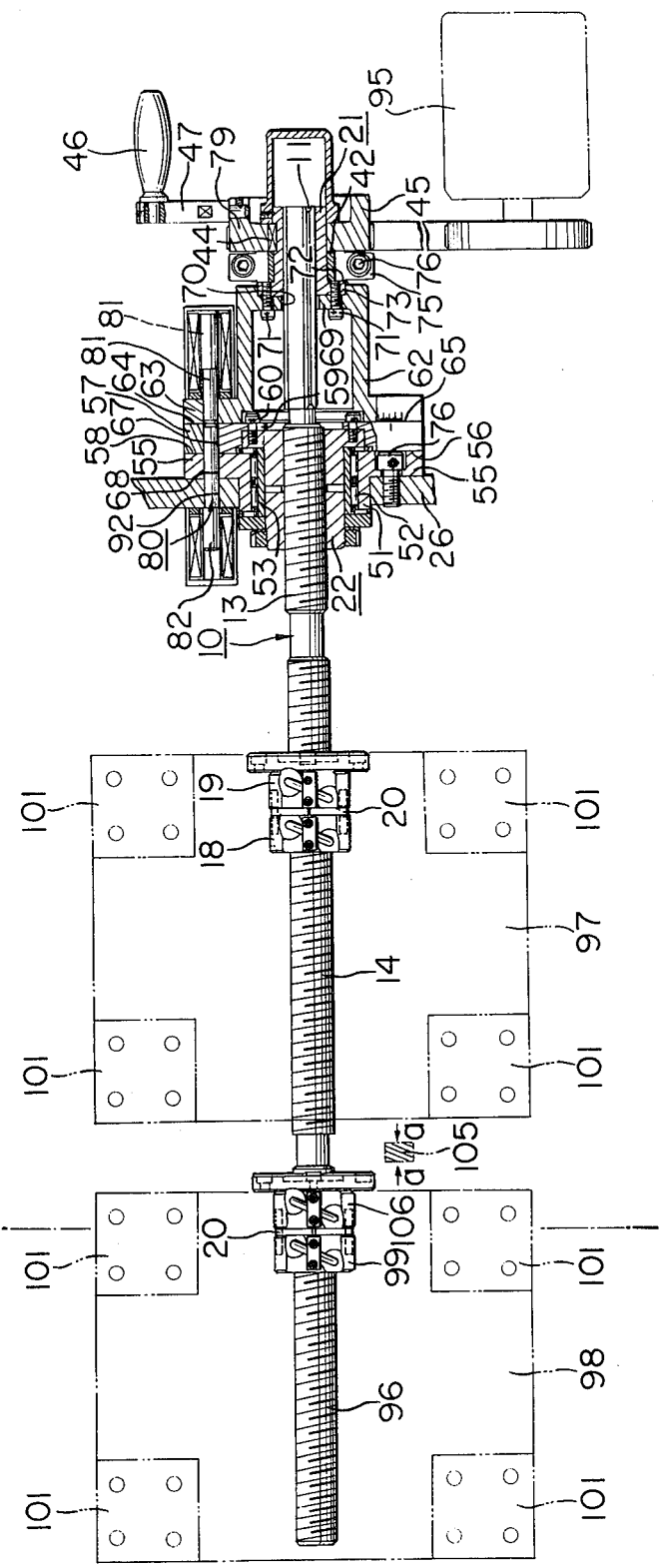

FIG. 7 is a sectional view of the ball screw assembly in accordance with still another embodiment of the present invention where the assembly of the invention is applied to two tables for a machine tool.

Figure 8:
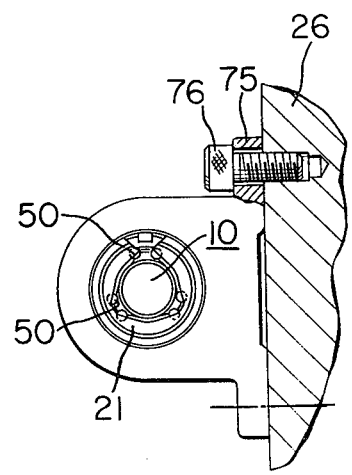

FIG. 8 is a partially sectioned view of a ball spline unit for the assembly of the present invention.

Figure 9:
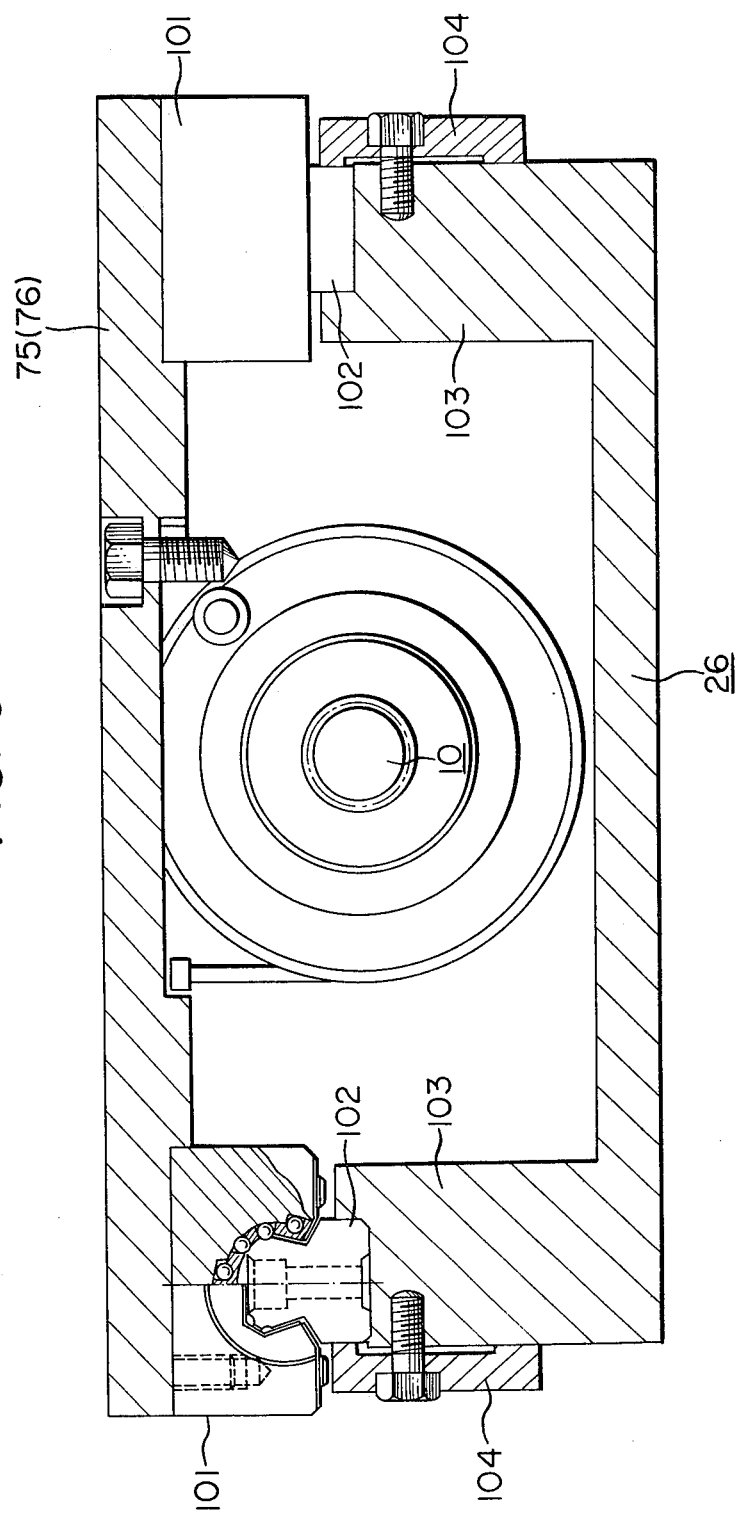
Figure 10:
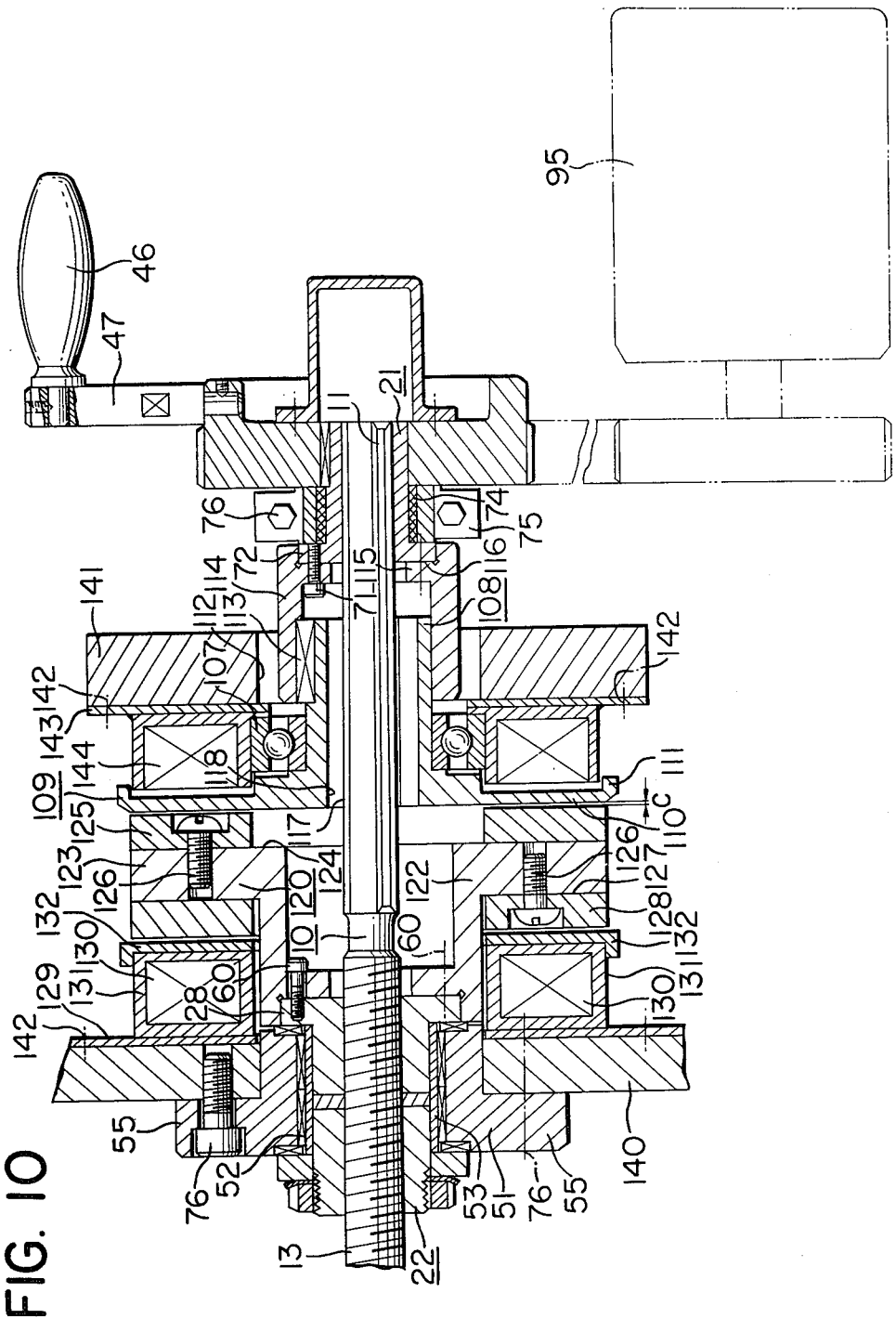

FIG. 9 is a cross-sectional view of the ball screw assembly of the present invention taken in line A—A in FIG. 7, and FIG. 10 is a longitudinally sectioned view of a ball screw assembly in accordance with still another embodiment of the present invention.

DETAILED DESCRIPTION OF THE INVENTION

Now the present invention will be described in more details with reference to the accompanying drawings which illustrate preferred embodiments of the invention.

Reference numeral 10 designates a shaft which contains a spline 11 at the right end part thereof, a first screw 13 located rightward of a central plain part 12 and a second screw 14 located leftward of said central plain part 12.

The first screw 13 has a pitch different from that of the second screw 14 and more specifically, they are designed such that the second screw 14 has a pitch larger than that of the first screw 13.

The first screw 13 is in screw engagement with ball screw nuts 15 and 16 in a double nut type (hereinafter referred to merely as ball screw nut 15). The ball screw nut 15 is disposed at both sides relative to a shim plate 17 (which is identified by reference numerals 20 and 24 in FIGS. 4(a) and (b)).

A ball spline 21 is fitted onto the spline 11 with balls 50 arranged therebetween so that the shaft 10 with the spline 11 formed thereon is slidable through the ball spline 21, whereby the shaft 10 can be rotated either in the clockwise direction or in the counter-clockwise direction by way of the balls 50 when a rotational force is imparted to the ball spline 21.

Figure 1:
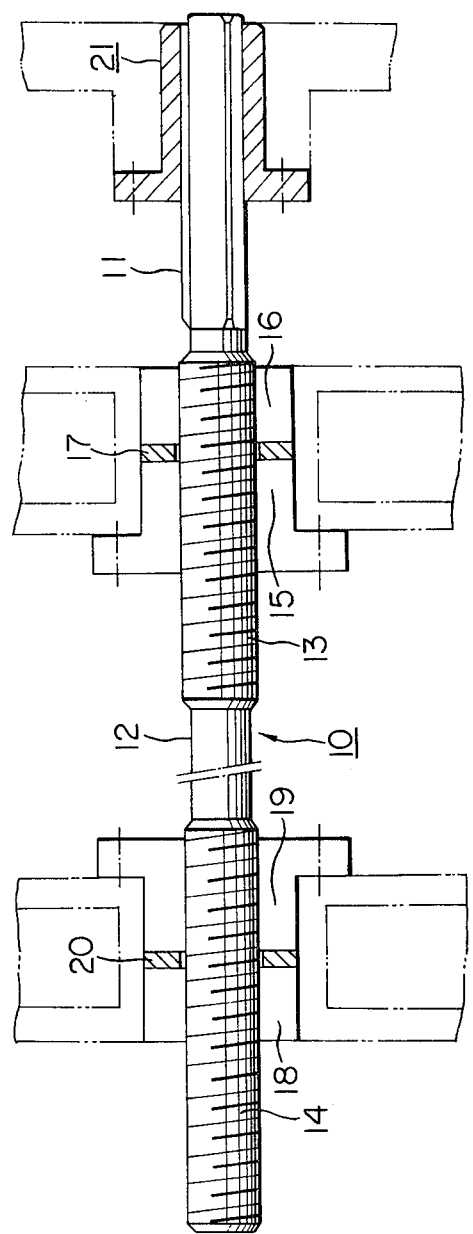
FIG. 1 is a partially sectioned front view of a power transmission mechanism in accordance with the present invention, illustrating a basic structure of the same.

Now the operation of the above assembly as illustrated in FIG. 1 will be described below.

In FIG. 1 it is assumed that the shaft 10 is supported by means of a bearing (not shown) at the left end thereof as seen in the drawing and it is supported by means of a frame or housing (not shown) in which the ball spline is rotationally held or by means of a bearing in which a shaft extension from the spline shaft is rotationally and reciprocatingly held at the right end of the shaft 10, wherein the first and second ball screw nuts 15 and 18 are movable.

When a rotational force is transferred to the ball spline 21 in the counter-clockwise direction (leftward rotation) while it is held in a predetermined position, the shaft 10 is caused to rotate together with the ball spline 21. As the shaft 10 starts its rotation, the first screw 13 as well as the second screw 14 start their rotation at the same time.

As the first and second screws 13 and 14 rotate, the first movable nut 15 as well as the second movable nuts 18 and 19 (hereinafter referred to merely as ball screw nut 18) move in the leftward direction respectively, but due to the pitch difference existent between the first and second screws 13 and 14 the result is that the first nut 15 is separated from the second nut 18. In other words, due to the existence of the pitch difference the first movable nut 15 moves backwards in the rightward direction as seen in the drawing relative to the second nut 18, while the latter moves forwards in the leftward direction relative to the former, so that relative displacement is effected.

To sum up, relative approaching or parting is effected as the first movable nut moves on the shaft toward the second one or away from the same in the manner described.

Therefore, when cutting or grinding tools are firmly mounted on tables to which the respective movable ball screw nuts are fixedly secured while a workpiece is firmly located intermediate both the movable tables, a cutting or grinding operation is performed on both the side faces of the workpiece by means of the tools at the same time.

Alternatively, the cutting tools may be replaced with arms which serve as a robot arm.

Next, FIGS. 2, 5, 6, 7, 9 and 10 illustrate another preferred embodiments of the present invention, wherein parts or members similar or same to those in FIG. 1 are identified by the same reference numerals and their detailed description is omitted for the purpose of simplification.

Figure 2:
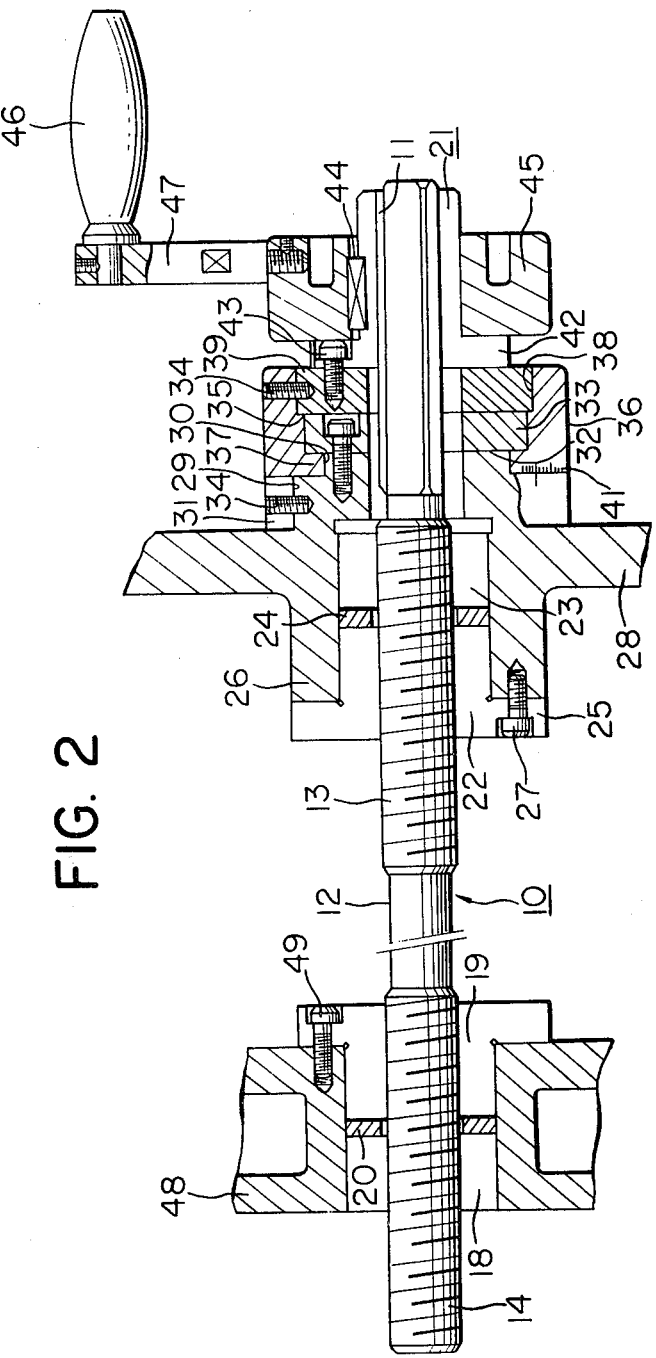
FIG. 2 is a partially sectioned front view of a power transmission mechanism in accordance with a modified embodiment of the present invention.

The embodiment of the present invention as illustrated in FIG. 2 is substantially the same as that in FIG. 1 except that one ball screw nut is stationary, while the other one is movable. In FIG. 2 ball screw nuts 22 and 23 are fitted onto the first screw 13 of the shaft 10 with a shim plate 24 located therebetween.

The ball screw nut 22 and 23 (hereinafter referred to merely as ball screw nut 22) are fitted into a stationary housing 26 and a flange 25 of the ball screw nut 22 is fixedly secured to the housing 26 by means of set screws 27 at the left end relative to a frame 28 thereof.

As a result, the ball screw nut 22 becomes a stationary ball screw nut which is firmly held in the housing 26.

The housing 26 has a raised portion formed behind the frame 28, said raised portion containing a larger cylindrical surface 29 and a smaller cylindrical surface 30.

Onto the larger cylindrical surface (see FIG. 2) is fitted a ring 31 which is firmly fixed thereto by means of set screw 34. Further, an annular disc 33 is firmly fixed to the rear end face 32 of the housing 26 by means of set screw 35.

The dimensions of annular disc 33 are such that its outer diameter is a little larger than the diameter of the rear end face 32 of the housing 26.

The annular recess between the ring 31 and the annular disc 33 is filled with a flange portion 37 of the annular member 36 which has a substantially L-shaped cross-sectional configuration and an open end 38 of said annular member 36 is fitted with another annular disc 39 which is fixedly secured to it by means of set screws.

As is apparent from the drawing, the annular member 36 is calibrated along the left peripheral edge thereof opposite to the end face of the ring 31, as identified by reference numeral 41.

Further, the annular disc 39 has a flange 42 of the ball spline 21 fixedly secured thereto at the right end face by means of set screw 43, said ball spline 21 being fitted onto the spline shaft 10 with a number of balls 50 interposed therebetween.

Reference numeral 44 designate a key which serves for holding an annular member 45 fixedly mounted on the ball spline 21.

An arm 47 of a handle 46 is fixedly located in position on said annular member 45.

Reference numeral 48 designates a movable member such as a table or the like which is fixedly mounted on the second movable ball screw nut 18 by means of set screws 49.

Now the operation of the shaft assembly as illustrated in FIG. 2 will be described below.

As the shaft 10 rotates in the leftward direction by operating the handle 46, the spline 11 is caused to rotate together with the ball spline 21, but no power transmission is effected to the stationary ball screw nut 22, because the cross-sectional L-shaped annular member 36 fixedly connected to the left end part of the ball spline 21 rotates idly in the annular recessed part of the housing.

As a result the shaft 10 moves backwards (in the rightward direction as seen in the drawing), while it is led by the first screw 13 in the stationary ball screw nut 22 (which is fixedly secured to the housing).

On the other hand, as the shaft 10 rotates in the leftward direction, the second movable ball screw nut 18 fitted in thread engagement with the second screw 14 of the shaft 10 is caused to move forwards in the leftward direction as seen in the drawing.

Due to the fact that the second movable screw nut 18 has a pitch smaller than that of the stationary ball screw nut 22, movement of the second movable ball screw nut 18 is effected at a very slow rate corresponding to the pitch difference between the screw nuts 18 and 22.

Assuming that the stationary ball screw nut has a pitch of 10.1 and the second movable ball screw nut 18 has a pitch of 10.0, the result is that the second movable ball screw nut 18 moves at a fine feed rate of 0.1 which is equal to the difference between the two pitches.

As illustrates in FIG. 4, the ball screw nut in accordance with the present invention is designed in a pre-stressed ball screw nut without any backlash relative to a corresponding screw, wherein it comprises two nut halves which are assembled and tightened by means of several pieces of bolts. In the meanwhile, as illustrated in FIG. 3, the ball spline in accordance with the present invention is designed in a pre-stressed ball spline without any angular lash in the direction of rotation, wherein a number of load carrying balls 50 are symmetrically arranged at both the sides of each of three splines 11 on the shaft 10. Accordingly, it is ensured that the ball spline is operated without any play between the sleeve and spline when rotating the handle as illustrated in FIG. 2 and thereby excellent sensibility in response to movement of the ball screw nut at a very slow feed rate is obtained.

The embodiment of the present invention as illustrated in FIG. 5 is same as that in FIG. 2 except that the stationary ball screw nut rotates together with the shaft when a mechanical knock pin is actuated.

A nut sleeve case 51 contains an inner ring 53 fitted therein with needle bearings 52 interposed therebetween and further said inner ring 53 contains a stationary ball screw nut 22 in a double nut type fitted therein.

Stationary ball screw nuts 22 are disposed at both the sides of a shim plate 24 and a shaft 10 comprising a first screw 13. In the meanwhile, a right end face 56 of a flange 55 radially extending from the nut sleeve case 51 is coaxially located in abutment with a left end face 58 of an intermediate joint member 57 and moreover an inner flange 59 radially extending from said intermediate joint member 57 is firmly secured to a flange 61 of the stationary ball screw nut 22. Reference numeral 62 designates a cap-shaped joint member having a flange and a central hollow space. A left end face 64 of the flange 63 at the one end of said joint member 62 is located in abutment with a right end face 57 of said intermediate joint member 57.

The end flange 63 of the joint member 62, the intermediate member 57 and the flange 55 of the nut sleeve case 51 have drilled holes 66, 67 and 68 respectively, each of which is located in alignment with the other so that a knock pin extends therethrough.

An end member 69 of the joint member 62 has a central hole 70 drilled therethrough and moreover the end member 69 is formed with an axially recessed part 73 in which a flange 72 of the ball spline 21 is adapted to be fitted and then fixedly secured by means of bolts 71.

A spline 11 is slidably fitted into the ball spline 21 with a number of balls 50 interposed therebetween (see FIG. 3).

The ball spline 21 has a metal bush 74 fitted on the outer periphery thereof, said metal bush 74 being firmly contained in a bearing case with the aid of bolts 76.

At the end part of the ball spline 21 is disposed an end cover 77 which is firmly fixed thereto by means of set screws, said end cover 77 having a hollow space 78 of whic depth is dimensioned equal to the displacement of shaft 10 which moves forwards and backwards while it is rotated.

A key groove is provided across the outer periphery of the ball spline 21 and the inner bore wall of a sprocket 79 so that a flat key 44 is fixedly fitted into said key groove, said sprocket 79 being located intermediate the bearing case and end cover 77.

Further, the sprocket 79 has an annular portion 45 projected from the side face thereof in the same direction as that of the end cover 77 and a lowr end of a connecting rod 47 is fixedly attached to said annular portion 45. A handle 46 is connected to the upper end of the rod 47.

Reference numeral 80 designates a knock pin which comprises a driving pin 81 and a driven pin 82. Said driving pin 81 is formed with an annular groove 83 at a predetermined position into which a plurality of balls 84 are adapted to sink.

The flange 63 of the joint member 62 has a cylindrical sleeve 86 firmly secured thereto at the outer end part as identified by reference numeral 85 and drilled holes are provided in position on said cylindrical sleeve 86 so that the balls 84 are received therein. To prevent the balls 84 from falling down out of the drilled holes a cylindrical cover 88 is capped over the sleeve 86 with a coil spring 54 disposed at the left end thereof.

At the right end of driving pin 81 is provided a stopper 89 which serves also as a push-pull means. When the driving pin 81 has slid through the drilled holes 66 and 67 of the joint member 63 and intermediate joint member 57, said stopper 89 comes in engagement against the end part 90 of the cylindrical cover 88 and then it stops.

On the other hand, the driven pin 82 is divided into two parts by means of a flange 91 located at a predetermined position, wherein the right part of the driven pin 82 extends through a drilled hole 92 of the housing 26 as well as drilled holes 67 and 68 of the flange of the nut sleeve case 11 and the intermediate member 57, while the left part of the same is received in a spring case 93 with a coil spring 94 contained therein in abutment against the flange 91.

It is to be noted that the knock pin 80 is normally urged in the rightward direction by means of the coil spring 94.

Operation of the assembly is as follows:

First, thrust the driving pin 81 in the leftward direction as seen in the drawing. Thus, the driven pin 82 moves to the left together with the driving pin 81 while their end faces are kept in abutment with one another, until they are located at the position where the right end face 56 of the flange 55 of the nut sleeve case 51 comes in contact with the left end face 58 of the intermediate joint member 57.

Then, as the shaft 10 is rotated in the counter-clockwise direction, the joint member 62 is rotated together with the ball spline 21 whereby the intermediate joint member 57 is rotated in the same rotational direction by way of the knock pin 80. As a result, the stationary ball screw nut 22 as well as the shaft 10 are simultaneously rotated together with the intermediate joint member 57. At first, the forward or backward movement of the shaft 10 is effected by means of the stationary ball screw nut 22, but as the shaft 10 starts to be led by the movable ball screw nut 19, it moves backwards to the right as seen in the drawing and at the same time the movable ball screw nut 19 moves forwards to the left as seen in the drawing due to the pitch difference between the two ball screw nuts.

As long as the driving pin 81 is located in the position as illustrated in FIG. 5, the stationary ball screw nut 22 does not rotate together with the shaft 10.

Since the operation of the movable ball screw nut 19 is the same as that of the assembly in FIG. 2, no description will be necessary.

Next, the embodiment of the present invention as illustrated in FIG. 7 is substantially same as that in FIG. 5 except that actuation of the knock pin is electromagnetically effected and a third screw 96 is provided at a certain distance from the second screw 14. Said third screw 96 has a pitch smaller than that of the second screw 14 and the second and third screws 14 and 96 have the first and second tables 97 and 98 mounted thereon with the ball screw nuts disposed therebetween.

First, the driving pin 81 is actuated in the rightward direction as seen in the drawing. Thus, it moves to the right together with the driven pin 82, until their end faces are located to the position where the left end face 64 of the joint member 62 comes in contact with the right end face 65 of the intermediate joint member 57.

Then, as the ball spline 21 is caused to rotate in the counter-clockwise direction by way of rotation of the handle 46 or actuation of the stepping motor 95, the shaft 10 is rotated together with the ball spline 21 whereby joint member 62 connected to the ball spline 21 at the right end thereof is rotated at the same rotational speed.

Since the left end face 65 of the end flange 63 of the joint member 62 is brought merely in rotational sliding contact with the right end face 64 of the intermediate joint member 57, no power transmission is effected to the stationary ball screw nut 22.

As a result, the shaft 10 moves backwards (to the right as seen in the drawing), while it is guided by the stationary ball screw nut 22 (which is fixedly secured to the housing).

Further, as the shaft 10 moves backwards while it rotates in the leftward direction, the movable screw nut 18 (having a pitch smaller than that of the stationary ball screw nut 22) in screw engagement with the second screw 14 coaxially integral with the shaft 10 moves forwards to the left as seen in the drawing.

Specifically, the shaft 10 moves backwards by one pitch by means of the stationary ball screw nut 22, but the movable screw nuts 18 and 19 move forwards by one pitch by means of the second screw 14 having a pitch smaller than that of the first screw 13. Assuming that the stationary ball screw nut 22 has a pitch of 10.1 and the movable ball screw nut 18 has a pitch of 10.0, movement of the latter is effected at a very slow feed rate corresponding to the pitch difference of 0.1. As a result the first table 97 moves forward at a very slow feed rate.

The movable ball screw nuts 99 and 100 (hereinafter referred to merely as ball screw nut 99) in the form of a double nut in screw engagement with the third screw 96 move forwards also in the same manner as the foregoing.

As a result, the movable ball screw nut 99 moves forwards at a very fine feed rate corresponding to the pitch difference from the first screw 13 and thereby the second table 98 carried by the movable screw nut 99 moves forwards at a very slow feed rate.

Thus the first and second tables approach relative to one another at a speed corresponding to the pitch difference therebetween in response to the backward movement of the shaft 10.

On the contary, when the shaft 10 is caused to rotate in the clockwise direction (in the rightward direction), it moves forwards by one pitch, but the first and second tables move backwards by one pitch by means of the second and third screws 14 and 96.

The first and second tables 97 and 98 contain linear bearings 101 which are located at both the slides and fixedly secured to the bottom surface thereof by means of bolts. The linear bearings 101 are slidably mounted on track beds 102 (see FIG. 9).

As is apparent from the drawing, the track beds 102 are firmly held on the support 103 raised from the housing 26 with the aid of a holder 104 and bolts 104a.

Provided that cutting tools (not shown) are fixedly arranged on the first and second tables 97 and 98, it is possible to effect cutting operation to both the side walls of a workpiece 105 by displacing the cutting tools in the opposite direction as indicated with arrow marks a and a' at the same time.

Next, when the driving pin 81 is actuated to the right as seen in the drawing, the joint member 62 becomes integral with the intermediate joint member 57.

As the first screw 13 of the shaft 10 is rotated in the counter-clockwise direction, the ball screw nut 22 is rotated together with the first screw 13.

Thus, the movable screw nuts 18 and 19 move backwards to the right, while they are parted away from one another gradually to such an extent as determined by the pitch difference therebetween. In other words, the one movable ball screw nut 18 moves backwards to the right, while the other movable screw nut 99 moves forwards to the left relative to the former, whereby relative parting (apparent displacement) from one another occurs.

Next, the embodiment of the present invention as illustrated in FIG. 10 is substantially the same as those in FIGS. 5 and 7 except that the driving pin is replaced with a switching device mounted directly on the shaft 10.

In the drawing, the reference numerals 140 and 141 designate both side walls of the housing. A retainer plate 143 for preventing rotation of the first field is fixedly secured to the right side wall 141 of the housing by means of set screws 142 and a field core with an annular exciting coil 144 incorporated therein is in turn attached to said retainer plate 143 by way of welding or the like.

A roller bearing 107 is fitted into said field core 106 and a rotor 109 with a hub 108 axially projected therefrom is in turn fitted into said roller bearing 107.

Said rotor 109 comprises a rotary disc 110 and a top end flange 111 and is located opposite to the exciting coil 144 and the field core in a closely spaced relation, whereas said axially extending hub 108 is projected at an appreciable distance outward of the side wall 141 through a drilled hole 112 and has an inner wall 118 the dimensions of which is such as not to come in contact with the outer peripheral surface 117 of the ball spline. A cup-shaped joint member 114 is fitted onto the forward end part of the hub 108 with a key 113 disposed on the outer periphery thereof.

Said joint member 114 is formed with an axially recessed part 116 on the right end portion 115 thereof in which a flange 72 of a ball spline 21 is received and fixedly secured by means of bolts 71.

An intermediate joint member 120 has an axial extension of which inner flange is connected to a flange portion of a stationary ball screw nut 22 by means of bolts 60.

Said intermediate joint member 120 has a considerably large hollow space between the inner wall 122 and the shaft 10 and a flange 123 extends radially from the hollow space. A first armature 125 is attached to the right end face 124 of flange 123 by means of bolts 126, whereas a second armature 128 is attached to the left end face 127 by means of another bolts 126. A flange 55 of a nut sleeve case 51 is fixedly secured to the left side wall 140 of the housing by means of bolts 76.

A tight clearance C is provided between the end-face of the first armature 125 and the end-face of the first rotor 109.

An inner ring 53 is rotatably fitted into the nut sleeve case 51 with a needle bearing 52 interposed therebetween and a stationary ball screw nut 22 is in turn fitted into said inner ring 53.

A retainer plate 129 for preventing rotation of the second field is attached to the left side wall 140 of the housing by means of set screw or the like 142 and a second field core 131 with a second annular coil 130 incorporated therein is in turn attached to said retainer plate 129 by way of welding or the like.

Further, a second rotor 132 is fixedly secured to the side face of said second field core 131 so that a tight clearnace C is provided between the end face of the second rotor 132 and the end face of the second armature 128.

Now the operation of the aforementioned assembly will be described.

First, the shaft 22 is rotated in the leftward direction by manually rotating the handle 46 or actuating the stepping motor 95. Thus, the ball spline 21 is caused to rotate together with the shaft 22 and at the same time the joint member 114 operatively connected to the ball spline 21 is rotated at the same speed.

Then, rotation of the joint member 114 is transmitted to the rotor 109 by way of the key 113.

The rotor 109 is freely rotatable in the roller bearing 107 irrespective of the annular exciting coil 106 in the form of a single disc type electromagnetic clutch.

Thus, the shaft 10 moves backward (in the rightward direction as seen in the drawing) while it is led by the first screw 13 in the stationary ball screw nut 20 (rotatably held in the side wall 140 of the housing).

When the shaft 10 has reached a predetermined position, the electromagnetic clutch is turned on by way of actuation of a limit switch (not shown) and thereby magnetic flux is produced through the annular exciting coil 144, the rotor 109 and the first armature 125 so that the first armature 125 is quickly attracted to the frictional surface of the rotor 109. As a result, clutch connection is made by frictional force over the contact surface whereby the intermediate joint member 120 is rotated together with the ball spline 21 in the same direction as that of the latter, that is, in the leftward direction.

Since the stationary ball screw nut 22 as well as the shaft 10 are rotated together with the intermediate joint member 120, no forward or backward movement of the shaft 10 is effected and it is kept in stoppage.

However, due to the fact that the shaft 10 is guided by means of the movable ball screw nut 18 (see FIGS. 1 and 3) the former moves backwards in the rightward direction as seen in the drawing and the latter moves forwards in the leftward direction.

When the electromagnetic clutch is turned off and the single disc type electromagnetic brake is turned on, the second annular exciting coil 130, the second field core 131 and the second rotor 132 are magnetized whereby the second armature 128, the intermediate joint member 120 and the first armature 125 are quickly attracted to the left, causing the clutch to be turned off.

Thus, the intermediate joint member 120 and the first stationary ball screw nut 22 are subjected to braking and thereby their rotation is instantaneously stopped. As a result the first screw 13 moves backwards while it is guided by the first stationary ball screw nut 22. As described herein before, rotation of the intermediate joint member 120 is initiated or stopped by means of the electromagnetic clutch as well as the electromagnetic brake mounted directly on the shaft 10. Thus, it is ensured that switching operation to quick feed or slow feed of the second and third movable ball screw nuts is instantaneously performed.

Further, since the slow feed mechanism of the present invention is constructed of very small number of components, a ball screw assembly is provided which is easy to be maintained and has very few possibility of causing failure and trouble.

Further, since the ball screw assembly has high rigidity and very little wear, exact positioning and long durability are ensured.

Furthermore, since changing of the direction of slow feed is effected without any play, excellent followability is ensured.

Furthermore, since the ball screw nut is displaced at a slow feed rate in response to power input, a highly magnified thrust force is imparted to the ball screw nut.

What is claimed is:

1. A power transmission mechanism for exact and slow feed with a ball screw assembly containing a ball spline unit (21), said ball screw assembly comprising: a shaft (10) consisting of two parts, one of the two parts being formed as a spline (11) and the other one containing at least two screws (13, 14), spaced apart from one another at a predetermined distance, wherein the respective screws having a different pitch are in screw engagement with a corresponding ball screw nut (22, 18), and the ball spline unit (21) is fitted into the spline (11), said mechanism being characterized in that the ball screw nuts consist of a stationary ball screw nut (22) and a movable ball screw nut (18), said stationary ball screw nut (22) being held in a housing, said housing having a front and rear end part, said spline (11) being in said rear end part, and said movable ball screw nut (18) being secured to a movable member, the ball spline unit (21) being rotatably arranged at the rear end part of the housing with a ring member (33) disposed on the spline, and, a rotational driving member (46) is operatively connected to the ball spline unit, said ball spline (21) being fitted onto said shaft (10) with balls (50) interposed therebetween.

2. A mechanism as claimed in claim 1 wherein said ball spline hs an outer periphery, said driving member (46) being attached to said outer periphery.

3. A mechanism as claimed in claim 1 wherein said spline (11) mounted on said shaft (10) has three spline means, each spline means having two symmetrical sides, with balls (50) disposed therein.

* * * * *